United States Patent
Odulinski et al.

(10) Patent No.: US 11,882,104 B2
(45) Date of Patent: Jan. 23, 2024

(54) SECURITY SYSTEMS AND METHODS FOR REMOTE TECHNICAL SUPPORT

(71) Applicant: ASURVIO, LP, Temple, TX (US)

(72) Inventors: Bogdan Odulinski, Austin, TX (US); Brett Pany, Lakeway, TX (US)

(73) Assignee: ASURVIO, LP, Austin, TX (US)

( * ) Notice: Subject to any disclaimer, the term of this patent is extended or adjusted under 35 U.S.C. 154(b) by 323 days.

(21) Appl. No.: 17/404,690

(22) Filed: Aug. 17, 2021

(65) Prior Publication Data
US 2022/0060459 A1 Feb. 24, 2022

Related U.S. Application Data

(60) Provisional application No. 63/069,529, filed on Aug. 24, 2020.

(51) Int. Cl.
*H04L 9/40* (2022.01)
*G06F 21/50* (2013.01)
*G06F 21/44* (2013.01)

(52) U.S. Cl.
CPC ............. *H04L 63/08* (2013.01); *G06F 21/44* (2013.01); *G06F 21/50* (2013.01); *H04L 63/10* (2013.01); *H04L 63/18* (2013.01); *G06F 2221/033* (2013.01)

(58) Field of Classification Search
CPC ......... G06F 21/50; G06F 21/44; H04L 63/08; H04L 63/10; H04L 63/18
See application file for complete search history.

(56) References Cited

U.S. PATENT DOCUMENTS

| | | | |
|---|---|---|---|
| 8,438,378 B2 | 5/2013 | Lazar | |
| 10,452,440 B1 * | 10/2019 | Odulinski | G06F 9/485 |
| 10,884,806 B1 | 1/2021 | Odulinski et al. | |
| 10,893,068 B1 * | 1/2021 | Khalid | G06F 21/554 |
| 2006/0253545 A1 * | 11/2006 | Lakamp | G06F 16/435 |
| | | | 709/217 |
| 2012/0110649 A1 * | 5/2012 | Murphy | G06F 21/606 |
| | | | 726/4 |
| 2017/0318152 A1 * | 11/2017 | Chen | H04M 3/42068 |
| 2017/0324727 A1 * | 11/2017 | Zucker | H04W 12/04 |
| 2018/0041540 A1 * | 2/2018 | Tas | H04L 63/10 |
| 2021/0211517 A1 * | 7/2021 | Albero | H04L 67/306 |

* cited by examiner

*Primary Examiner* — Chau Le
(74) *Attorney, Agent, or Firm* — WINSTEAD PC (57) ABSTRACT

In an embodiment, a method of securing remote technical support includes monitoring a computing environment for at least one indicator of remote-control software in the computing environment in accordance with stored authentication settings. The method also includes, responsive to the monitoring, detecting the at least one indicator of remote-control software in the computing environment. The method also includes, responsive to the detection, identifying an authentication profile in the stored authentication settings that is applicable to the at least one indicator of remote-control software. The method also includes executing an authentication workflow in accordance with the authentication profile. Other embodiments of this aspect include corresponding computer systems, apparatus, and computer programs recorded on one or more computer storage devices, each configured to perform the actions of the methods.

20 Claims, 4 Drawing Sheets

SECURITY SYSTEMS AND METHODS FOR REMOTE TECHNICAL SUPPORT

CROSS-REFERENCE TO RELATED APPLICATIONS

This patent application claims the benefit under 35 U.S.C. § 119(e) of U.S. Provisional Patent Application No. 63/069,529 filed on Aug. 24, 2020. U.S. Provisional Patent Application No. 63/069,529 is hereby incorporated by reference in its entirety.

BACKGROUND

Technical Field

The present disclosure relates generally to resource management and more particularly, but not by way of limitation, to security systems and methods for remote technical support.

History of Related Art

Numerous scams are carried out under the guise of technical support. For example, a user may be notified by email, popup message or phone call of a supposed problem on their device that requires immediate technical intervention. The notification often appears to originate from a reputable and recognizable technology company, such as one from which the user is known to have acquired a product or service, when in actuality it is from a scammer with malicious objectives. Commonly, this results in the user unwittingly granting remote access to their device so that the supposed problem can be fixed. The scammer may then steal data or execute other malicious activity.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of securing remote technical support. The method includes monitoring the computing environment for at least one indicator of remote-control software in the computing environment in accordance with stored authentication settings. The method also includes, responsive to the monitoring, detecting the at least one indicator of remote-control software in the computing environment. The method also includes, responsive to the detection, identifying an authentication profile in the stored authentication settings that is applicable to the at least one indicator of remote-control software. The method also includes executing an authentication workflow in accordance with the authentication profile. Other embodiments of this aspect include corresponding computer systems, apparatus, and computer programs recorded on one or more computer storage devices, each configured to perform the actions of the methods.

In an embodiment, another general aspect includes a computer system that includes a processor and memory. The processor and the memory in combination are operable to implement a method. The method includes monitoring a computing environment for at least one indicator of remote-control software in the computing environment in accordance with stored authentication settings. The method also includes, responsive to the monitoring, detecting the at least one indicator of remote-control software in the computing environment. The method also includes, responsive to the detection, identifying an authentication profile in the stored authentication settings that is applicable to the at least one indicator of remote-control software. The method also includes executing an authentication workflow in accordance with the authentication profile.

In an embodiment, another general aspect includes a computer-program product that includes a non-transitory computer-usable medium having computer-readable program code embodied therein. The computer-readable program code is adapted to be executed to implement a method. The method includes monitoring a computing environment for at least one indicator of remote-control software in the computing environment in accordance with stored authentication settings. The method also includes, responsive to the monitoring, detecting the at least one indicator of remote-control software in the computing environment. The method also includes, responsive to the detection, identifying an authentication profile in the stored authentication settings that is applicable to the at least one indicator of remote-control software. The method also includes executing an authentication workflow in accordance with the authentication profile.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Remote-control software, such as remote desktop software, can allow a computing environment to be run remotely on one system while being displayed on a separate device. The computing environment can thereby be remotely controlled using another device that is connected via the Internet or another network. Remote-control software is widely used by technology companies and help desks to facilitate, for example, remote technical support. For purposes of this patent application, a computing environment can refer to the environment in which physical and/or virtual computing resources are consumed, often at the direction of a user, computer process or other entity. A computing environment can include, among other things, physical and virtual computing resources, an operating system, and software applications.

In various cases, scammers may use the pretext of remote technical support, for example, to secure trust and convince their victims to install remote-control software, which software they can then exploit to access their victims' computing environments. Since remote-control software has many legitimate purposes, traditional security measures fall short in their ability to mitigate or prevent this type of attack. The problem is particularly acute when a user already utilizes a service provider for remote technical support. In such cases, it is often easy for the user to be duped into believing that that the scammer is from that service provider and has a valid need to access their computing environment.

The present disclosure describes examples of a monitoring agent that detects indicators of remote-control software in a computing environment and executes appropriate authentication, prevention and/or remediation. In various embodiments, a customizable authentication workflow can be triggered on certain user or system actions in relation to remote-control software such as, for example, when the user downloads, installs, launches and/or gives focus to remote-control software.

Figure 1:
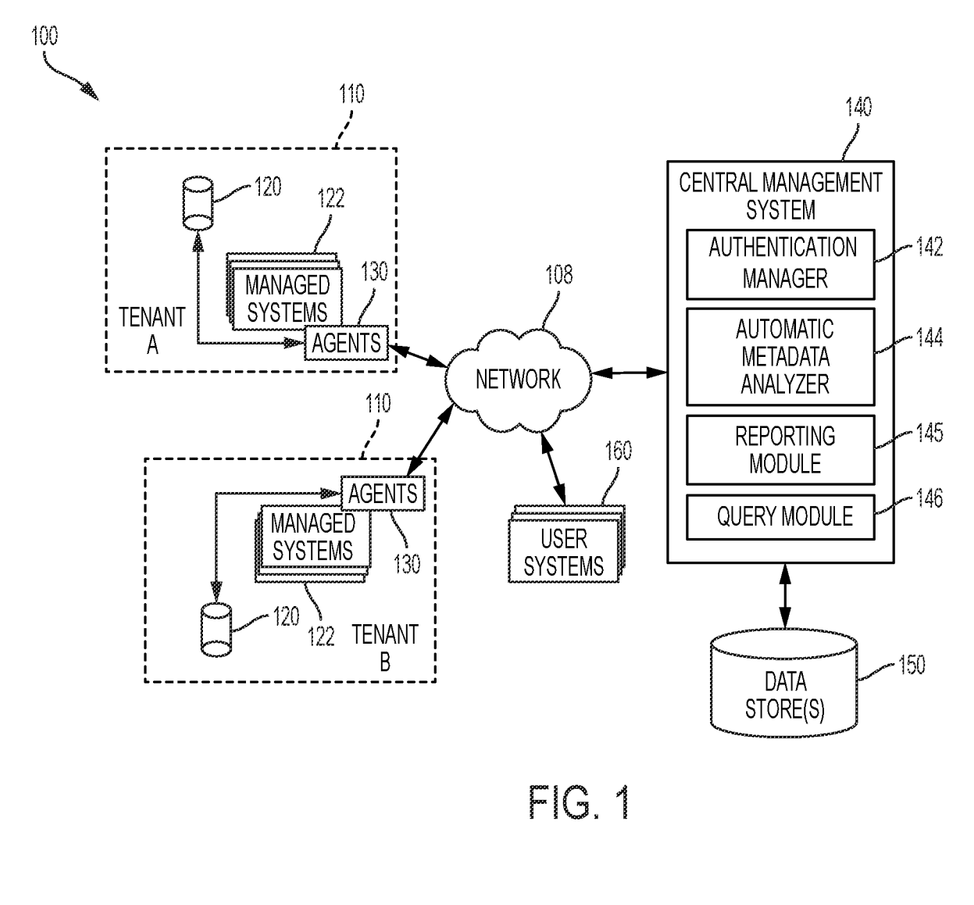
FIG. 1 illustrates an example of a system for implementing a central management system.

FIG. 1 illustrates an example of a system 100 for implementing a central management system 140. The system 100 includes the central management system 140, tenant systems 110, user systems 160 and one or more data stores 150, each of which is operable to communicate over a network 108. The network 108 may be a private network, a public network, a local or wide area network, a portion of the Internet, combinations of the same, and/or the like. Each of the tenant systems 110 can represent an installation of physical and/or virtual computing infrastructure.

In certain embodiments, the central management system 140 can centrally manage agent-monitoring of computing environments, such as individual user environments and workspaces, for its tenants. In particular, in the system 100, the tenant systems 110 can be served by the central management system 140. The tenant systems 110 shown can be owned or operated by the same or different entities. For example, one of the tenant systems 110 is shown as owned or operated by "Tenant A" while another tenant system 110 is owned or operated by a different tenant, "Tenant B." For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

Each of the tenant systems 110 includes one or more managed systems 122 and one or more local data stores 120 (hereinafter, "local data store(s) 120"). The managed systems 122 can include physical and/or virtual computing devices, such as physical machines and/or virtual machines. For instance, the managed systems 122 may include any of the following: a physical computer system, a virtual machine, server, web server, application server, database, database server, network switches or other network hardware, combinations of the same or the like. Any given tenant system 110 can include from one to several managed systems 122. For example, a tenant system 110 can represent an entire data center having hundreds or even thousands of managed systems 122. An example of a computer system that can serve as one of the managed systems 122 will be described in relation to FIG. 2.

As illustrated, the managed systems 122 can include monitoring agents 130 that are installed in computing environments provided thereby. The monitoring agents 130 can facilitate automatic scanning and/or performance-optimization of the computing environments in a configurable fashion. In various embodiments, the central management system 140 and the monitoring agents 130 may be associated with, or provide authentication as a service for, one or more service providers that periodically provide remote technical support via remote-control software. In certain embodiments, the monitoring agents 130 can, as part of their functionality, monitor for, and detect, indicators of remote-control software in relation to the computing environment in accordance with authentication settings stored in the local data store(s) 120.

The authentication settings of the local data store(s) 120 can include, for example, service-provider information, authentication triggers, authentication profiles, information related to valid service providers, other information or settings, combinations of same and/or the like. Although, for simplicity of illustration, the authentication settings are described relative to the local data store(s) 120, it should be appreciated that, in various embodiments, the authentication settings can be stored in the local data store(s) or centrally in the one or more data stores 150. For example, in some embodiments, the monitoring agents 130 can interact with the authentication manager 142 to conduct authentication, in whole or in part, in accordance with authentication settings of the same type that are stored in the one or more data stores 150, or in a combination of the local data stores(s) 120 and the one or more data stores 150. Other variations will be apparent to one skilled in the art after a detailed review of the present disclosure.

As mentioned previously, in certain embodiments, the central management system 140 and the monitoring agents 130 may each be associated with, or provide authentication as a service for, one or more service providers that periodically provide remote technical support via remote-control software. In some such cases, an agent validly conducting remote technical support for a given service provider may be another user of one of the computing environments, or of one of the user systems 160. In addition, or alternatively, the agent may be registered with the central management system 140 as a technical support agent with a named service provider. In this way, the central management system 14 and components thereof can, in some cases, communicate with the agent in this fashion over the course of executing authentication workflows of the type described herein.

In general, the service-provider information can identify or include valid service providers that are registered as such with the central management system 140 (including information and processes that are later used for authentication). A valid service provider can be, for example, a service provider from which the user or tenant is registered to receive service including remote technical support, a service provider associated with an operator of the central management system 140, any of a list of service providers that are registered with the central management system 140 for purposes of authentication as a service, combinations of the foregoing and/or the like. For each service provider included therein, the service-provider information can identify remote-control software utilized by the service provider and include, for example, name, version number, and metadata. It should be appreciated that the service-provider information can be configured globally for the central management system 140 and/or on a customized basis for individual users or tenants.

In general, the authentication triggers of the local data store(s) 120 can each specify an indicator (or combination of indicators) of remote-control software in the computing environment. In a typical embodiment, the detection of an authentication trigger by a given monitoring agent of the monitoring agents 130 results in that monitoring agent initiating an authentication workflow. Examples of indicators that can be specified in authentication triggers include, for example, a user or system downloading, installing, launching and/or giving focus to remote-control software, a user or system receiving a prompt from the remote-control software for granting remote access to another, a user or system granting remote access to another, combinations of the foregoing and/or the like.

The authentication profiles of the local data store(s) 120 can define authentication workflows, for example, as one or more actions, some of which may be conditional on certain information or results of other actions. In certain embodiments, the authentication profiles of the local data store(s) 120 can each be associated with one or more the authentication triggers of the local data store(s) 120. In certain embodiments, the authentication profiles of the local data store(s) 120 can represent authentication workflows that are used to verify that the conditions responsible for a given authentication trigger correspond to a valid instance of remote technical support.

The authentication workflows can be varied according to numerous factors such as, for example, the specific remote-control software, user and/or tenant at issue and/or a nature or type of detected indicators (e.g., launching, installing, downloading, or giving focus to the remote-control software). In some cases, the authentication profiles can be specific to, and vary by, service provider. For example, a given monitoring agent of the monitoring agents 130 could, in some cases, provide a user a list of valid service providers, from which the user selects one from a list (e.g., based on a representation made by an alleged technical support agent), thereby causing an authentication profile for that service provider to be applied.

In some embodiments, the authentication workflows can include actions for authenticating technical support agents that are allegedly providing remote technical support. A failure to successfully authenticate the agent as designated in an action may be considered a failed authentication. In some embodiments, mutual authentication can be performed, such that a user of a computing environment receiving remote technical support is also authenticated in any suitable fashion.

In an example of authenticating a technical support agent, for a given monitoring agent of the monitoring agents 130 that is installed on a given managed system of the managed systems 122, the given monitoring agent can prompt a user to request authentication information from the agent. The authentication information is typically information that should already be in the agent's possession, such as a number or code, which information the user enters into an interface provided by the monitoring agent. Generally, the user is in contact with the technical support agent via an out-of-band method such as voice or text-based communication and can request and receive the authentication information from the agent via that method. In various cases, the authentication information is information sufficient to identify, and/or validate an identify of, the service provider, the technical support agent, or both. According to this example, the monitoring agent can receive the authentication information from the user and confirm that the authentication information corresponds to a valid service provider and/or agent, as applicable. In a typical embodiment, if the technical support agent is unable to provide authentication information for entry by the user, or if the monitoring agent receives information that it is unable to validate as corresponding to a valid service provider and/or agent, authentication will fail. In some embodiments, if the information provided by the agent is validated, the authentication workflows can further include actions that contact the technical support agent directly using known contact information. In some such cases, a response may be required (e.g., an acknowledgment of a technical support session and/or further verification) before authentication is deemed successful.

In addition, or alternatively, the technical support agent can be validated using agent location information. The agent location information can relate, for example, to a network location and/or a physical location from which the agent is allegedly providing technical support. For example, the agent can be associated with a network identifier such as an Internet protocol (IP) address, a telephone number, etc. In various embodiments, the network identifier can be extracted, as at least part of the agent location information, from the prompt from the remote-control software for granting remote access to another, from the remote-control software via an interface, log or other method, and/or in another suitable fashion. In some cases, the given monitoring agent can prompt the user to provide all or part of the agent location information (e.g., a telephone number). In various embodiments, the agent location information, however obtained, can be used to directly validate its correspondence to a valid service provider and/or agent. For example, the given monitoring agent can automatically evaluate an IP address and/or a telephone number against a known range of IP addresses and/or telephone numbers for each one or more valid service providers and/or agents, against a whitelist or blacklist for each of one or more valid service providers and/o agents, and/or the like. In addition, or alternatively, the given monitoring agent can generate further agent location information, for example, by resolving the network identifier or location to a physical location (e.g., city, country, etc.). Thereafter, the given monitoring agent can determine whether the physical location corresponds to a valid physical location for each of one or more valid service providers and/or agents using, for example, rules, machine learning, whitelists, blacklists, and/or the like. As discussed previously, in some embodiments, if the agent location information is validated, the authentication workflows can further include actions that contact the technical support agent directly using known contact information. In some such cases, a response may be required (e.g., an acknowledgment of a technical support session and/or further verification) before authentication is deemed successful.

In addition, or alternatively, the authentication workflows can include actions for authenticating remote-control software indicated by a given authentication trigger, for example, by determining whether the remote-control software is a software tool utilized by at least one of a valid service provider and a valid technical support agent as specified in the authentication settings in the local data store(s) 120. A failure to validate the remote-control software as such a tool may be considered a failed authentication action. In various embodiments, the remote-control software can be validated by a comparison of name and version number or other information (e.g., file name, file metadata, etc.). In some embodiments, the authentication of the remote-control software can advantageously precede, for example, authentication of alleged technical support agents in the fashion described above. In some of these embodiments, authentication efficiency can be improved by skipping authentication of technical support agents if it has already been confirmed that the remote-control software is not a software tool that would be utilized by a valid service provider. In this situation, authentication can be deemed to fail without performing additional authentication actions.

It should be appreciated that the foregoing are merely specific examples of types of authentication actions that may be specified in the authentication workflows of the authentication profiles in the local data store(s) 120. Numerous variations are contemplated as falling within the scope of the present disclosure. For example, in some embodiments, the central management system 140 maintains, or has access to in the one or more data stores 150 or otherwise, open support tickets that identify users that may be subject to remote technical support. In this situation, authentication may fail if there is no open support ticket identifying a user in whose computing environment an authentication trigger is detected. Numerous other variations of authentication actions will be apparent to one skilled in the art after a detailed review of the present disclosure.

Still with reference to the authentication workflows of the authentication profiles in the local data store(s) 120, in various embodiments, some or all of the authentication workflows can specify notifications that take place before, during and/or in response to authentication triggers or other actions in the authentication workflows. For example, a given authentication workflow can specify that, if an authentication trigger is detected in a particular computing environment provided by one of the managed systems 122, the user, a supervising user and/or an administrator are notified in any suitable fashion (e.g., email, popup message, dashboard notification, text message, etc.). In addition, or alternatively, the given authentication workflow can specify that such notifications occur upon some or all failed authentication actions and/or some or all successful authentication actions.

Still with reference to the authentication workflows of the authentication profiles in the local data store(s) 120, in various embodiments, some or all of the authentication workflows can specify security actions that take place before, during and/or in response to authentication triggers or other actions in the authentication workflows. Examples of security actions include requiring approval of a user, supervising user and/or an administrator, blocking remote-control software, locking access to some applications or data (or all applications and data), combinations of the foregoing and/or the like. For example, a given authentication workflow can specify that, if an authentication trigger is detected in a particular computing environment provided by one of the managed systems 122, one or more specific security actions are taken. In addition, or alternatively, the given authentication workflow can specify that such security actions are taken upon failed authentication actions or a subset thereof.

In certain implementations, the monitoring agents 130 can monitor for the authentication triggers specified in the local data store(s) 120. As authentication triggers are detected, the monitoring agents 130 can initiate or perform authentication workflows that are specified in authentication profiles associated with the triggers. In some embodiments, the monitoring agents 130 can each represent two or more agents that are resident in a given computing environment. In these embodiments, the functionality of each of the monitoring agents 130 can be distributed among the two or more agents. Example operation of the monitoring agents 130 with respect to example authentication settings will be described in greater detail with respect to FIGS. 2-4.

In certain embodiments, the authentication settings of the local data store(s) 120 can be established at a central level by the central management system 140, at a tenant level by one or more of the tenant systems 110, and/or at an individual system or user level for individual ones of the managed systems 122. In some cases, some or all of the local data store(s) 120 can be tenant-specific such that the managed systems 122 of at least some of the tenant systems 110 can share, for example, repositories of authentication settings, some which may be customized by or for particular tenants. In some cases, some or all of the local data store(s) 120 can be system-specific such that at least some of the managed systems 122 maintain their own repositories of authentication settings, some of which may be customized for particular systems or users. In addition, or alternatively, in some embodiments, the local data store(s) 120 can be omitted such that all authentication settings are accessed directly from the central management system 140 without a local copy being retained by individual tenants or systems.

In certain embodiments, the monitoring agents 130 can generate authentication metadata during the course of operation. The authentication metadata can include, for example, time-series data related to the performance of physical and/or software components, such as processor utilization, memory utilization, other resource-usage indicators, combinations of same and/or the like. In addition, or alternatively, the authentication metadata can include, for example, data indicating results of each authentication workflow performed and/or results of each action specified therein. In some embodiments, the monitoring agents 130 can generate authentication metadata before and/or after performing authentication workflows specified by a given authentication profile, before and/or after utilization of remote-control software, etc. Authentication metadata generated by the monitoring agents 130 can be stored in the local data store(s) 120 or in other memory designated for such storage.

In the illustrated embodiment, the central management system 140 can include an authentication manager 142, an automatic metadata analyzer 144, a reporting module 145 and a query module 146. Each of these components can be implemented with hardware and/or software. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

The authentication manager 142 can cause monitoring agents, such as the monitoring agents 130, to be installed on the managed systems 122. In some cases, the monitoring agents 130 can be retrieved from the one or more data stores 150. In addition, or alternatively, the authentication manager 142 can periodically provide, from the one or more data stores 150, authentication settings to the monitoring agents 130. The provided authentication settings can include, for example, authentication triggers, authentication profiles, updates to the foregoing, combinations of same and/or the like.

In addition, in some embodiments, the authentication manager 142 can serve a data collection function. For example, the authentication manager 142 can receive, from the monitoring agents 130, tenant and/or user-specific authentication settings that are defined by a tenant or user. In addition, the monitoring agents 130 can collect authentication metadata from the managed systems 122. This authentication metadata can include any of the authentication metadata described above. The authentication metadata that is collected can also include information about attributes, characteristics, or properties of the managed systems 122. The monitoring agents 130 can collect some or all of the above-mentioned data or metadata in real-time, periodically, for example, according to a schedule, on-demand, or a combination of the same. In addition, the monitoring agents 130 can provide some or all of the above-mentioned data to the authentication manager 142 upon request, or, in some cases, as a live stream. The authentication manager 142 can store collected data, for example, in the one or more data stores 150.

In certain embodiments, features of the components of the central management system 140 can be made accessible over an interface to the user systems 160. For example, the authentication manager 142, or another component, can publish a configuration interface to the user systems 160, for example, for administrators, super users or other users (e.g., of a particular tenant) to select or specify commands (e.g., for adding or editing authentication settings for specific tenants or managed systems). The user systems 160 can include any type of computing device, including computer systems such as desktops, laptops, tablets, smartphones, wearable devices, to name a few. The user systems 160 can be operated by users associated with the tenants or by other users.

The automatic metadata analyzer 144 can automatically identify trends in authentication metadata stored in the one or more data stores 150. For example, the automatic metadata analyzer 144 can analyze each authentication profile and the authentication metadata related to its execution. For example, if different authentication profiles are associated with different service providers, the automatic metadata analyzer 144 can identify service providers that achieve a greatest number of authentication failures or a highest percentage of authentication failures. A relatively high number of failures might indicate that a particular service provider and its customers are being targeted for scams and/or that authentication profiles for such service provider may benefit from revision or other special attention.

The reporting module 145 can generate regular or on-demand reports related to the managed systems 122. In various cases, these reports can provide a snapshot of some or all of the managed systems 122. The reporting module 145 typically accesses data related to the managed systems 122 via the query module 146. The reporting module 145 can publish reports or other generated information, for example, to a web page, dashboard, and/or the like. The query module 146 can generate and execute a query of the one or more data stores 150. In various cases, the query module 146 can be triggered by and work in conjunction with the reporting module 145. The web page, user dashboard or other user interface(s) output, for example, by the reporting module 145, can be accessed by users of the user systems 160. The query module 146 can also provide a user interface, for instance, that allows the users of the user systems 160 to obtain customized data related to any data maintained by the one or more data stores 150.

In general, the one or more data stores 150 can include any information collected, stored or used by the central management system 140. For example, in various embodiments, the one or more data stores 150 can include authentication metadata and authentication settings of the type described above. In certain embodiments, some of the authentication settings of the one or more data stores 150 can be centrally established, for example, by an administrator, super user or other user with appropriate access to the central management system 140. In addition, or alternatively, the one or more data stores 150 can include authentication settings collected from the local data store(s) 120. In these scenarios, at least some authentication settings can result from tenant-specific customizations and/or user-specific customizations on the monitoring agents 130. A subset of the authentication settings on the one or more data stores 150 can be designated as public, or default, for particular use cases or classifications of tenants or users. In certain embodiments, data stored in the one or more data stores 150 can take the form of repositories, flat files, databases, etc.

Figure 2:
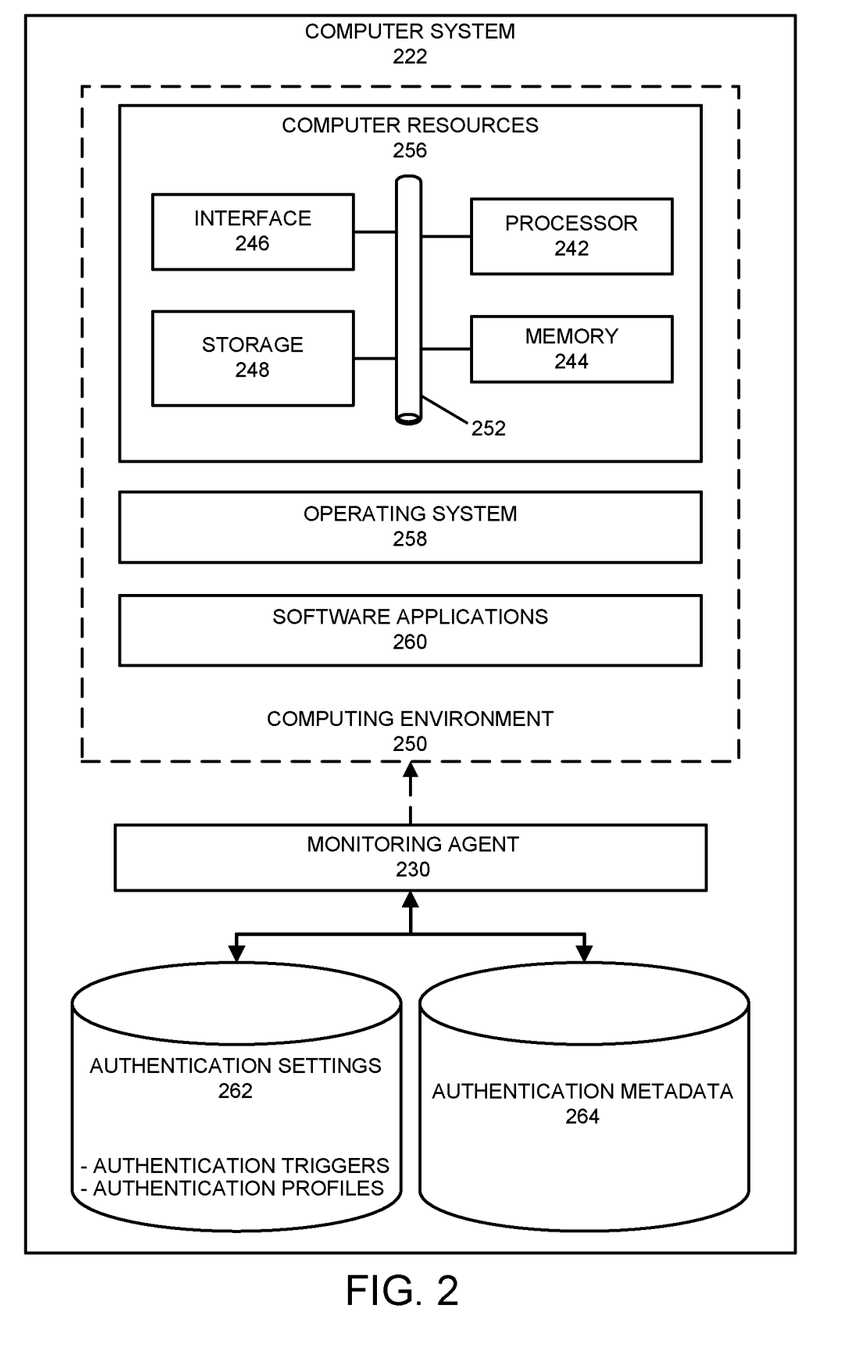
FIG. 2 illustrates an example of a computer system.

FIG. 2 illustrates an example of a computer system 222 that, in some cases, can serve as one of the managed systems 122 or one of the user systems 160, both of FIG. 1. The computer system 222 includes a monitoring agent 230 operable to monitor a computing environment 250. The computing environment 250 includes computer resources 256, an operating system 258, and software applications 260. In particular embodiments, the computer system 222 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The computer resources 256 of the computer system 222 may comprise any suitable physical form, configuration, number, type and/or layout. As an example, and not by way of limitation, the computer system 222 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 222 may include one or more computer systems; be unitary or distributed; span multiple locations; span multiple machines; or reside in a cloud, which may include one or more cloud components in one or more networks.

In the depicted embodiment, the computer resources 256 include a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the operating system 258, the software applications 260, and the monitoring agent 230. Such functionality may include providing various features discussed herein. In particular embodiments, processor 242 may include hardware for executing instructions, such as those making up the monitoring agent 230. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include RAM. This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 222, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 222 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 222, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which computer system 222 is used. As an example and not by way of limitation, computer system 222 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 222 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 222 may include any suitable interface 246 for any one or more of these networks, where appropriate.

In some embodiments, interface 246 may include one or more interfaces for one or more I/O devices. One or more of these I/O devices may enable communication between a person and the computer system 222. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 222 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The operating system 258 can execute on and manage the computer resources 256 as well as provide common services for computer programs. The operating system 258 can be any one of many operating systems such as, for example, a version of MICROSOFT WINDOWS, APPLE IOS or ANDROID, a distribution of LINUX, other variants of UNIX operating systems, another operating system, etc. For example, the software applications 260 can execute on the operating system 258 using the common services provided thereby.

Although not explicitly illustrated as such, the monitoring agent 230 can execute on the operating system 258 as one of the software applications 260 and perform configurable monitoring and authentication in accordance with authentication settings 262. During the course of its execution, the monitoring agent can also generate and store authentication metadata 264 of the type described with respect to FIG. 1. In certain embodiments, the authentication settings 262 can include definitions of authentication triggers and authentication profiles. The authentication settings 262 and the authentication metadata 264 can reside in the storage 248 or in other memory such as, for example, one or more tenant-specific data stores that are shared across multiple managed systems. The authentication settings 262 and the authentication metadata 264 can be represented in one or more databases, one or more flat files, combinations of same and/or the like.

The authentication triggers of the authentication settings 262 can each specify an indicator (or combination of indicators) of remote-control software in the computing environment. In a typical embodiment, the detection of an authentication trigger by the monitoring agent 230 results in the monitoring agent 230 initiating an authentication workflow. Examples of indicators that can be specified in authentication triggers include, for example, a user or system downloading, installing, launching and/or giving focus to remote-control software, a user or system receiving a prompt from the remote-control software for granting remote access to another, a user or system granting remote access to another, combinations of the foregoing and/or the like. In certain embodiments, the authentication settings 262 can associate each authentication trigger with one or more of the authentication profiles. In that way, the authentication workflow specified by the associated authentication profile can be performed upon the detection of the authentication trigger.

Figure 3:
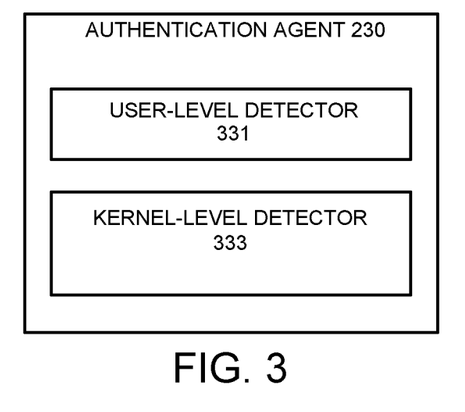
FIG. 3 illustrates a monitoring agent in more detail.

FIG. 3 illustrates the monitoring agent 230 in more detail. The monitoring agent 230 includes a user-level detector 331 and a kernel-level detector 333. In certain embodiments, CPUs provide a plurality of operating modes that place various restrictions on the type and scope of operations that can be performed. In certain embodiments, consumer user applications execute in a mode in which access to hardware or memory is restricted, often referred to as "user mode." For example, in various cases, applications executing in user mode may have no direct access to hardware or memory so that, instead, such applications must utilize system application programming interfaces to access hardware or memory. In contrast, the operating system and low-level, trusted operating-system functions may execute in an unrestricted mode, often referred to as "kernel mode."

Although consumer user applications typically execute in user mode, these applications are typically instantiated by the operating system in kernel mode. For instance, when loading an application, the operating system, in kernel mode, typically first copies an executable image into RAM, creates a main application thread, and performs other initialization steps. Advantageously, in certain embodiments, the kernel-level detector 333 can execute in the kernel mode so as to detect kernel-level events such as, for example, the copy of an executable image into RAM, the creation of a main application thread, and/or other initialization steps. In that way, the kernel-level detector 333 can detect the initiation of an application, identify an appropriate authentication profile, and apply authentication before the application has a chance to run. The user-level detector 331 can detect user-level events such as user behaviors, for example, in interacting with applications. An example of a user-level event is a user giving a particular application focus. In general, the user-level detector 331 and the kernel-level detector 333 can be considered two distinct software agents that can act individually or in concert to collectively constitute the monitoring agent 230. In various embodiments, user-level events and/or kernel-level events may be indicators of remote-control software and specified as such as all or part of a given authentication trigger.

Figure 4:
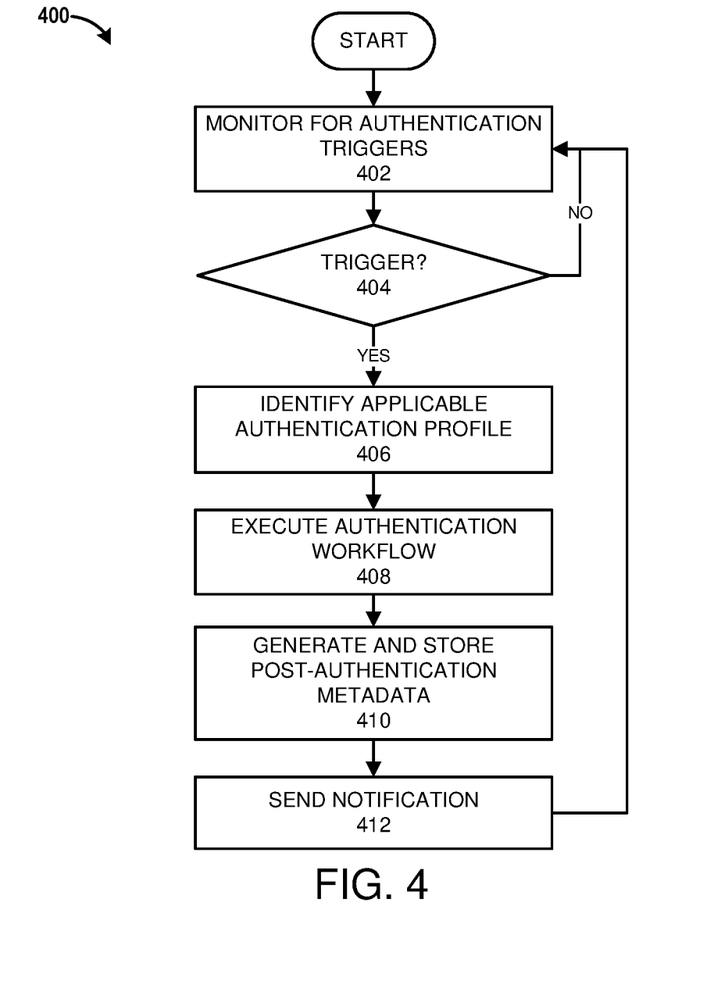
FIG. 4 illustrates an example of a process for performing agent-initiated authentication on a managed system.

FIG. 4 illustrates an example of a process 400 for performing agent-initiated authentication on a managed system such as, for example, one of the managed systems 122 of FIG. 1 and/or the computer system 222 of FIG. 2. In certain embodiments, the process 400 can be initiated on-demand by an administrator, super user or other user for a monitored system (e.g., via the user systems 160 in communication with the central management system 140 and the managed systems 122, both of FIG. 1). The process 400 can be implemented by any system that can provide a computing environment. For example, the process 400, in whole or in part, can be implemented by the central management system 140, one or more of the managed systems 122, one or more of the monitoring agents 130, the computer system 222, the monitoring agent 230, the user-level detector 331, the kernel-level detector 333, a component of the foregoing, and/or the like. In some cases, the process 400 can be performed generally by the system 100 of FIG. 1. Although any number of systems, in whole or in part, can implement the process 400, to simplify discussion, the process 400 will be described in relation to the computer system 222 of FIG. 2.

At block 402, the monitoring agent 230 monitors the computing environment 250 for authentication triggers that are specified in the authentication settings 262. In general, the block 402 can include monitoring for indicators of remote-control software in the computing environment 250 as specified in the authentication triggers. For example, the block 402 can include the kernel-level detector 333 monitoring for kernel-level events and/or the user-level detector 331 monitoring for user-level events. In various embodiments, the monitoring agent 230 can periodically generate authentication metadata of the type described in relation to FIG. 1 as the computing environment 250 is monitored.

At decision block 404, the monitoring agent 230 determines whether an authentication trigger has been detected. If not, the process 400 returns to block 402 and the monitoring agent 230 continues to monitor the computing environment 250 for authentication triggers. Otherwise, if it is determined at decision block 404 that an authentication trigger has been detected, the process 400 proceeds to block 406. In some cases, as discussed above, the authentication trigger can be a kernel-level event that allows authentication to occur, for example, before remote-control software begins running.

At block 406, the monitoring agent 230 identifies, from the authentication settings 262, an authentication profile that is applicable to the detected authentication trigger. The applicable authentication profile can be based, at least in part, on a service provider associated with the computing environment 250, the central management system 140, a given user, a given tenant, etc. At block 408, the monitoring agent 230 executes an authentication workflow in accordance with the identified authentication profile. The block 408 can include, for example, executing authentication actions, notification actions and security actions of the type described relative to FIG. 1.

At block 410, the monitoring agent 230 generates and stores post-authentication metadata. The post-modification authentication metadata can include any of the example authentication metadata described in relation to FIG. 1, such as an indication of results of each action performed for a given authentication workflow (e.g., failed or successful authentication action, notification sent, security action implemented, etc.). Any post-modification authentication metadata that is generated can be stored, for example, among the authentication metadata 264.

At block 412, the monitoring agent 230 can send a notification regarding a result of the authentication workflow to a user of the computer system 222 (e.g., failed authentication, successful authentication, etc.). The notification can be, for example, a notification on a user interface provided by the monitoring agent 230, a popup notification, an email, an instant message, combinations of same and/or the like. In some cases, particularly if the monitoring agent 230 is associated with a particular service provider, the notification can include a customized message for that service provider (e.g., "WARNING: XYZ Company did NOT initiate this session.").

From block 412, the process 400 returns to block 402, where the monitoring agent 230 again monitors for authentication triggers. In certain embodiments, the process 400 can continue to execute until terminated by a user or administrator, a computer process or an entity in communication with the computer system 222, or whenever other suitable termination criteria is satisfied.

Although the process 400 is illustrated as using a monitoring agent that distributes certain functionality between a kernel-level detector and a user-level detector, it should be appreciated that the same functionality could also be allocated to a single agent or to three or more agents. For example, in some embodiments, a single agent executing at the user level or the kernel level could incorporate all of the functionality described above with respect to the user-level detector 331 and the kernel-level detector 333.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of securing remote technical support, the method comprising, by a computer system comprising a computing environment:
   monitoring the computing environment for at least one indicator of remote-control software in the computing environment in accordance with stored authentication settings;
   responsive to the monitoring, detecting the at least one indicator of remote-control software in the computing environment;
   responsive to the detection, identifying an authentication profile in the stored authentication settings that is applicable to the at least one indicator of remote-control software; and
   executing an authentication workflow in accordance with the authentication profile.

2. The method of claim 1, comprising sending a notification regarding a result of the authentication workflow to a user of the computer system.

3. The method of claim 1, wherein the at least one indicator of remote-control software is selected from the group consisting of:
   downloading remote-control software;
   installing remote-control software;
   launching remote-control software;
   giving focus to remote-control software;
   receiving a prompt from remote-control software for granting remote access to another; and
   granting remote access to another.

4. The method of claim 1, wherein:
   the computer system provides authentication as a service to a plurality of providers of remote technical support; and
   the stored authentication settings comprise a plurality of authentications that vary by provider of the plurality of providers of remote technical support.

5. The method of claim 1, the executing the authentication workflow comprising authenticating a technical support agent.

6. The method of claim 5, the authenticating the technical support agent comprising:
   prompting a user to request authentication information from the technical support agent via an out-of-band communication method;
   receiving the authentication information from the user; and
   validating the authentication information as corresponding to at least one of a valid service provider and a valid agent.

7. The method of claim 6, the authenticating comprising, responsive to the validating:
   contacting the technical support agent using known contact information; and
   requiring a response from the technical support agent before authentication is deemed successful.

8. The method of claim 5, the authenticating the technical support agent comprising:
   prompting a user to request authentication information from the technical support agent via an out-of-band communication method;
   receiving the authentication information from the user; and
   causing authentication to fail responsive to a determination that the authentication information does not correspond to at least one of a valid service provider and a valid agent.

9. The method of claim 5, the authenticating the technical support agent comprising authenticating the technical support agent using location information for the technical support agent, the location information identifying at least one of a physical location and a location on a network.

10. The method of claim 8, the authenticating the technical support agent comprising:
    receiving information related to a network location of the technical support agent; and
    validating that the information related to the network location of the agent corresponds to at least one of a valid service provider and a valid agent.

11. The method of claim 10, wherein the information related to the network location of the agent comprises at least one of an Internet Protocol (IP) address and a telephone number.

12. The method of claim 8, the authenticating the technical support agent comprising:
    receiving information related to a network location of the agent;
    resolving the information related to the network location to a physical location; and
    validating that the physical location corresponds to at least one of a valid service provider and a valid agent.

13. The method of claim 1, the executing the authentication workflow comprising authenticating the remote-control software.

14. The method of claim 13, the authenticating the remote-control software comprising determining whether the remote-control software is a software tool utilized by at least one of a valid service provider and a valid technical support agent as specified in the stored authentication settings.

15. The method of claim 13, the authenticating the remote-control software comprising, responsive to a determination that the remote-control software is not a software tool utilized by at least one of a valid service provider and a valid support agent as specified in the stored authentication settings, deeming authentication to fail.

16. The method of claim 15, comprising, responsive to the failed authentication of the remote-control software, skipping authentication of a technical support agent.

17. The method of claim 1, the executing the authentication workflow comprising deeming authentication to fail responsive to a determination that there is no open support ticket identifying a user in whose computing environment the at least one indicator is detected.

18. The method of claim 1 comprising, responsive to the executing the authentication workflow resulting in failed authentication, taking a security action selected from the group consisting of:
   requiring approval from a supervising user;
   blocking the remote-control software; and
   locking access to at least one of an application and data.

19. A computer system comprising a processor and memory, wherein the processor and the memory in combination are operable to implement a method comprising:
   monitoring a computing environment for at least one indicator of remote-control software in the computing environment in accordance with stored authentication settings;
   responsive to the monitoring, detecting the at least one indicator of remote-control software in the computing environment;
   responsive to the detection, identifying an authentication profile in the stored authentication settings that is applicable to the at least one indicator of remote-control software; and
   executing an authentication workflow in accordance with the authentication profile.

20. A computer-program product comprising a non-transitory computer-usable medium having computer-readable program code embodied therein, the computer-readable program code adapted to be executed to implement a method comprising:
   monitoring a computing environment for at least one indicator of remote-control software in the computing environment in accordance with stored authentication settings;
   responsive to the monitoring, detecting the at least one indicator of remote-control software in the computing environment;
   responsive to the detection, identifying an authentication profile in the stored authentication settings that is applicable to the at least one indicator of remote-control software; and
   executing an authentication workflow in accordance with the authentication profile.

* * * * *